(12) United States Patent
Dishart et al.

(10) Patent No.: US 6,384,790 B2
(45) Date of Patent: *May 7, 2002

(54) ANTENNA ON-GLASS

(75) Inventors: Peter T. Dishart; John A. Winter, both of Pittsburgh; Cheryl E. Belli, New Kensington, all of PA (US); Steve J. Sutara, Newburgh, IN (US); Donald P. Michelotti, Rochester Hills, MI (US)

(73) Assignee: PPG Industries Ohio, Inc., Cleveland, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,805

(22) Filed: Jun. 15, 1998

(51) Int. Cl.[7] .................................................. H01Q 1/32
(52) U.S. Cl. ...................................................... 343/713
(58) Field of Search ................................ 343/704, 712, 343/713; H01Q 1/32

(56) References Cited

U.S. PATENT DOCUMENTS

| | | | |
|---|---|---|---|
| 3,655,545 A | 4/1972 | Gillery et al. | 204/192 |
| 3,962,488 A | 6/1976 | Gillery | 427/109 |
| 3,977,004 A | 8/1976 | Bickel | 343/705 |
| 4,768,037 A | 8/1988 | Inaba et al. | 343/713 |
| 4,849,766 A | 7/1989 | Inaba et al. | 343/713 |
| 4,898,789 A | 2/1990 | Finley | 428/623 |
| 4,992,801 A | 2/1991 | Saito et al. | 343/713 |
| 5,083,134 A | 1/1992 | Saitou et al. | 343/713 |
| 5,083,135 A | 1/1992 | Nagy et al. | 343/713 |
| 5,284,376 A | 2/1994 | Zweigart | 296/96.19 |
| 5,306,547 A | 4/1994 | Hood et al. | 428/213 |
| 5,346,933 A | 9/1994 | Knell | 523/427 |
| 5,355,144 A | 10/1994 | Walton et al. | 343/713 |

(List continued on next page.)

FOREIGN PATENT DOCUMENTS

| | | |
|---|---|---|
| CA | 1193150 | 9/1985 |
| DE | 197 35 395 | 2/1998 |
| EP | 0 561 272 | 9/1993 |
| EP | 0 763 869 | 3/1997 |
| EP | 0 961 342 | 12/1999 |

OTHER PUBLICATIONS

Simons, R. N. et al., "Feasibility Study of Optically Transparent Microstrip Patch Antenna", IEEE Antennas and Propagation Society International Symposium 1997 Digest, Montreal, Quebec, Jul. 14–18, 1997, vol. 4, Jul. 14, 1997, pp. 2100–2103.

Patent Abstracts of Japan, 56024802, Mar. 10, 1981.

Primary Examiner—Michael C. Wimer
(74) Attorney, Agent, or Firm—Andrew C. Siminerio; Donald C. Lepiane (57) ABSTRACT

The present invention provides a transparent antenna including a transparent dielectric substrate, an electroconductive antenna element positioned along a major surface of the substrate, an electroconductive patch capacitively or directly connected to the antenna element, and a connector secured to the patch to permit transfer of signals generated by the antenna element to an electromagnetic energy transmitting and/or receiving device. The patch, is configured to have a visibility coefficient (i.e. a ratio of the non-opaque area to the total area) between 0 and 1. In one particular embodiment of the invention, the antenna element includes one or more transparent, electroconductive coatings positioned between first and second glass plies of a windshield for a motor vehicle and the electroconductive patch is applied to an exposed major surface of the windshield such that it overlays at least a portion of the antenna element and is capacitively coupled to the antenna element. The patch is may be formed from an opaque electroconductive ceramic IR, UV, thermoplastic or thermoset paint.

38 Claims, 4 Drawing Sheets

U.S. PATENT DOCUMENTS

| | | | |
|---|---|---|---|
| 5,411,768 A | 5/1995 | Knell et al. | 427/386 |
| 5,416,491 A | 5/1995 | Nishikawa et al. | 343/713 |
| 5,528,314 A | 6/1996 | Nagy et al. | 343/713 |
| 5,535,144 A | 7/1996 | Kise | 364/561 |
| 5,648,758 A | 7/1997 | Tweadey, II et al. | 340/550 |
| 5,659,324 A * | 8/1997 | Taniguchi et al. | 343/704 |
| 5,670,966 A | 9/1997 | Dishart et al. | 343/713 |
| 5,748,155 A | 5/1998 | Kadunce et al. | 343/713 |
| 5,898,407 A * | 4/1999 | Paulus et al. | 343/713 |
| 5,926,141 A | 7/1999 | Lindenmeier et al. | 343/713 |
| 6,020,855 A * | 2/2000 | Nagy et al. | 343/704 |

* cited by examiner

ANTENNA ON-GLASS

BACKGROUND OF THE INVENTION

1. Field of the Invention

The present invention relates to a vehicle antenna and, in particular to an antenna formed by a transparent coating laminated between two glass plies and an electrical connection arrangement for connecting the antenna to a radio or other transmitting/receiving device.

2. Technical Considerations

In the past, the traditional motor vehicle antenna for receiving and transmitting electromagnetic signals was a mast or whip type antenna. Recently there has been a trend towards incorporating the antenna into the vehicle structure. For example, U.S. Pat. Nos. 4,768,037 and 4,849,766 to Anaba, et al. and U.S. Pat. No. 5,355,144 to Walton, et al. disclose a transparent electroconductive coating over a substantial portion of a window and, in particular a vehicle windshield to form an antenna. In designing an antenna system, attention is given to matching the impedance of the system's components and, in particular matching the impedance of the radio, the antenna and a feed line electrically interconnecting the two components to improve the reception of selected radio signals. One way this issue has been addressed by antenna designers is to design the antenna to have a desired impedance, for example as disclosed in U.S. Pat. Nos. 5,083,135; 5,528,314; and 5,648,758 to Nagey, et al. However, designing an antenna to have a predetermined impedance would require each antenna to be designed specifically for the particular type of radio and feed line used in the particular antenna system, as well as the vehicle into which the antenna is installed.

In order to link the antenna element to an external device, connectors such as wires, braids or tabs have been laminated within the transparency to make electrical contact with an antenna element. However, it has been found that when incorporating these type of connectors between the plies of the laminate, air may be trapped in the laminate in the vicinity of the connector. It is believed that the air entrapment is the result of the connector hindering the de-airing of the laminate during a conventional roll prepress operation. Bubbles formed by the entrapped air detract from the aesthetics of the laminate, as well as increase the possibility of delamination and/or corrosion at or near the connection.

To solve both these problems, a capacitive type connection has been used to electrically interconnect the antenna elements to the feed lines for a radio, e.g. as disclosed in U.S. Pat. No. 5,355,144. More specifically, an electroconductive material is applied on the inner surface of the windshield and is capacitively coupled to a portion of a coating within the windshield that forms an antenna element. The area of the material on the inner surface of the windshield is adjusted to provide the proper capacitance between the antenna coating and the material. However, the presence of the connector material blocks the vision of the vehicle operator. It would be advantageous to provide a connection arrangement which provides the required capacitive performance for the connection while at the same time providing the vehicle operator increased visibility in the vicinity of the connector with minimal distraction.

SUMMARY OF THE INVENTION

The present invention provides a transparent antenna including a transparent dielectric substrate, an electroconductive antenna element positioned along a major surface of the substrate, an electroconductive patch capacitively or directly connected to the antenna element, and a connector secured to the patch to permit transfer of signals generated by the antenna element to an electromagnetic energy transmitting and/or receiving device. The patch, is configured to have a visibility coefficient (i.e. a ratio of the non-opaque area to the total area) between 0 and 1. In one particular embodiment of the invention, the antenna element includes one or more transparent, electroconductive coatings positioned between first and second glass plies of a windshield for a motor vehicle and the electroconductive patch is applied to an exposed major surface of the windshield such that it overlays at least a portion of the antenna element and is capacitively coupled to the antenna element.

DETAILED DESCRIPTION OF THE INVENTION

The present invention provides an improved connector arrangement for a glass antenna system. However, it should be appreciated that the present invention may be used in other transmitting or receiving antenna systems where increased visibility is a priority.

Figure 1:
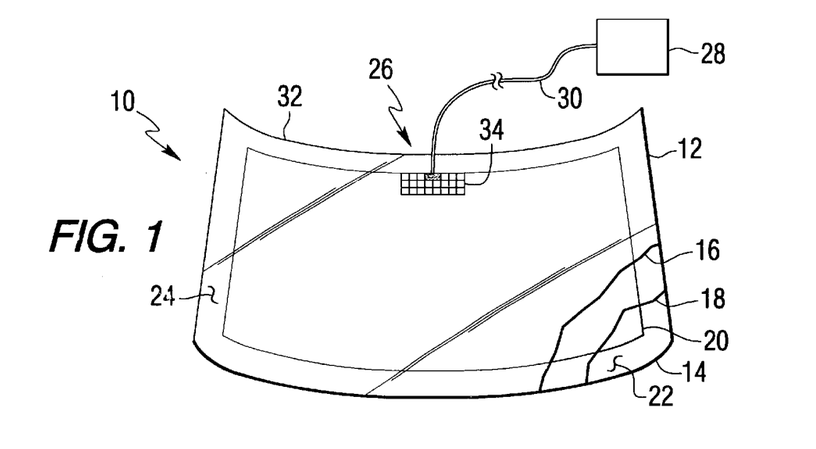
FIG. 1 is a plan view of a transparent glass antenna incorporating features of the present invention.

FIG. 1 illustrates an antenna system 10, including a laminated vehicle window, i.e. a windshield 12 formed by outer and inner glass plies 14 and 16, respectively, which are bonded together by a thermoplastic interlayer 18, preferably polyvinyl butyral. As an alternative, plies 14 and 16 may be other transparent rigid materials, for example, acrylic, polycarbonate, or the windshield 12 may include a combination of different transparent rigid materials. Windshield 12 further includes at least one antenna element 20. In the particular antenna configuration illustrated in FIG. 1, the antenna element 20 is a transparent electroconductive coating applied on surface 22 of outer ply 14, in a manner well known in the art, and generally occupies the central portion of the windshield 12. The coating may be a single or multilayered metal containing coating, for example, as disclosed in U.S. Pat. No. 3,655,545 to Gillery, et al.; U.S. Pat.

No. 3,962,488 to Gillery; and U.S. Pat. No. 4,898,789 to Finley. The windshield 12 may further include a decorative border (not shown) bonded to the marginal edge portion of the windshield 12. This border is typically formed from an opaque non-electrically conductive ceramic paint applied to surface 24 of inner ply 16, as is well known to those skilled in the art.

Although the antenna element 20 discussed above is a transparent coating, if the antenna element is not positioned in the major vision area of the windshield 12, or does not obstruct the windshield's main viewing area, antenna 20 may be a non transparent electroconductive material, for example, silver-containing ceramic paint, wires, metal foil, etc. In addition the antenna element 20 may include a combination of paint, wire and/or ceramic antenna elements. However, it is preferred that the antenna pattern provide a degree of visibility through the pattern.

With continued reference to FIG. 1, antenna element 20 in this particular configuration is basically quadrilateral in shape and preferably spaced from the peripheral edges of the windshield 12. However, it should be appreciated that the antenna element 20 may have a configuration different from that shown in FIG. 1. The exact shape and position of the antenna element 20, as well as inclusion of any additional antenna elements, depends in part on the design of the vehicle into which the windshield 12 is installed, the angle of the windshield installation, the coating resistivity, the type of signal to be transferred or received, and the desired performance of the antenna. These types of design considerations for a transparent glass antenna are discussed in U.S. Pat. Nos. 4,768,037 and 4,849,766. For example, antenna element 20 may have a shape and/or incorporate multiple elements as disclosed in U.S. Pat. Nos. 5,083,135; 5,528,514; 5,648,758; and 5,670,966.

An antenna feed arrangement 26 provides a connection between the antenna element 20 and an electromagnetic energy transmitting and/or receiving unit 28 via a feed line, for example, a coaxial cable 30. The connection may be a capacitive connection, as will be discussed with respect to FIGS. 1–12 of the present application, or it may be a direct electrical connection as will be discussed later in more detail. Unit 28 may be a radio, cellular phone, television, computer, global positioning system, or any other type of system that uses antenna element 20 to transmit and/or receive signals. Though not required in the particular antenna arrangement shown in FIG. 1, the antenna feed arrangement 26 is positioned along the upper edge 32 of the windshield 12. The antenna feed arrangement 26 is configured such that it is not laminated between plies 14 and 16. More specifically and referring to FIGS. 2 and 3, arrangement 26 includes an electroconductive element or patch 34 which is positioned in spaced apart relation from and overlays a portion of the antenna element 20. In the particular embodiment illustrated in these figures, patch 34 is secured to an exposed surface of windshield 12, and in particular, surface 24 of inner ply 16, and is spaced from the coating by inner ply 16 and interlayer 18 such that the patch 34 is capacitively coupled to the antenna element 20. It has been found that a capacitive connection may be configured to produce a capacitive reactance that matches the inductive reactance of the antenna to the radio 28 and coaxial cable 30 by minimizing the net reactive component, as disclosed in U.S. Pat. No. 5,355,144. This in turn results in optimal energy transfer from the antenna to the radio or other receiver.

Figure 2:
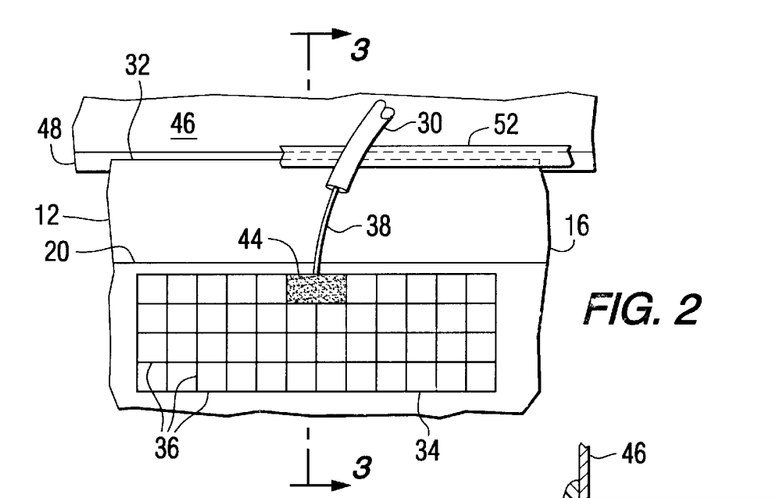
FIG. 2 is an enlarged plan view of the particular embodiment of the antenna connection arrangement illustrated in FIG. 1 showing a patch connector of the present invention, with portions removed for clarity.
Figure 3:
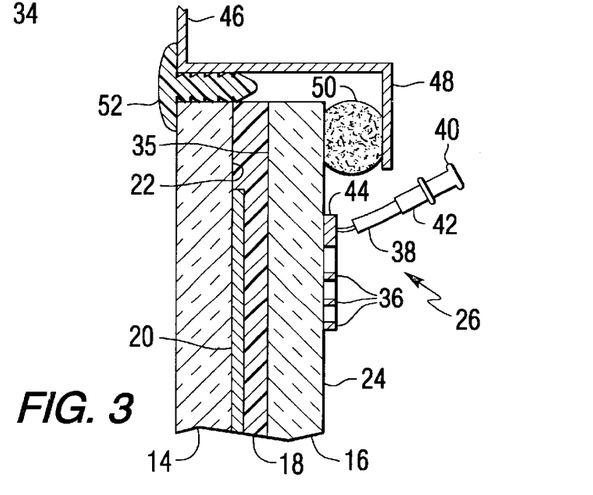
FIG. 3 is a sectional view taken along line 3—3 in FIG. 2, with portions removed for clarity.

Although the coating forming antenna element 20 in the embodiment of the invention in FIGS. 1–3 is positioned along surface 22 of outer ply 14, and more specifically, applied to surface 22 and laminated between two glass plies, the coating forming the antenna element may be applied to surface 35 of inner ply 16 or as an alternative, incorporated into the interlayer 18. Without limiting the present invention, for example, an antenna wire or electroconductive element may be positioned on or within interlayer 18. It is also contemplated that the antenna element may be applied to a flexible substrate such as a polyester film, which is turn is incorporated into an interlayer and/or laminate as disclosed in U.S. Pat. No. 5,306,547 to Hood, et al. In addition, it is anticipated that the antenna may be formed on a monolithic window assembly, e.g. along a major surface of a single glass ply with the antenna feed arrangement being positioned on the opposing major surface of the ply.

The required area of patch 34 overlaying a corresponding portion of antenna element 20 is based in part on the spacing between patch 34 and the antenna element 20, i.e. the thickness of the interlayer 18 and inner ply 16; the types of material used for the antenna element, patch, interlayer and glass; and the required antenna performance. Because signal transfer through the patch 34 is frequency dependent, lower frequency signals (such as AM radio signals) require a larger patch area than higher frequency signals (such as FM radio signals) to achieve acceptable antenna performance. In general, as the overlaying area of the capacitive patch increases, the signal transfer from the antenna connector arrangement approaches that of a direct connection to the antenna element. Capacitance may be controlled, among other ways, by either varying the electroconductivity of the patch material or by changing the area of overlap between the patch and a corresponding portion of the antenna coating.

An objective of the present invention is to provide a capacitive connection between the antenna element 20 and the feed arrangement 26 in such a manner that the patch 34 provides a desired amount of visibility through the windshield 12 so that the vehicle operator's visibility is not impaired through the portion of the windshield where the antenna feeding arrangement 26 is located, and in particular the upper portion of the windshield 12 as shown in FIG. 1, for example, when viewing a traffic signal. In addition, providing a degree of visibility through the patch 34 may be more aesthetically pleasing to the occupants of the vehicle. More specifically, the patch 34 may be designed to provide visibility through the connection. As an alternative, patch 34 may be designed to purposely block a portion of the light passing through the windshield 12, as will be discussed later in more detail. To this end, in one particular embodiment of the invention, the patch 34 is formed into a grid-like pattern as shown in FIGS. 2 and 3 using an opaque electroconductive material. The material used to form interconnected grid lines 36 may be, for example, an opaque electroconductive ceramic coating or paint. This type of material typically includes silver and glass frit combined with one of several types of carriers. It should be appreciated that the amount of silver used in an electroconductive ceramic paint depends on the conductivity required to produce the required capacitance between the grid lines 36 forming the patch 34 and the coating forming antenna element 20 and prevent significant resistive losses.

One type of paint that may be used to form patch 34 is an electroconductive ceramic paint of the type typically used to form heating lines on the rear window of vehicles. This paint generally includes silver particles, flow modifying agents, pigments and an infrared radiation dried carrier (this paint hereinafter referred to as "electroconductive ceramic IR paint"). With this type of material, the grid lines 36 are screen printed onto surface 24 of ply 16 using techniques well known in the art and heated in an oven or furnace to dry the ceramic paint. Additional or prolonged heating is required to cure the paint and bond it to the glass surface. Although it provides acceptable results, one short coming of using this type of ceramic paint is that it remains wet for an extended period of time, i.e. generally until it is dried by an oven. As an alternative, it is contemplated that the grid pattern may be formed using an opaque electroconductive ceramic paint which includes silver particles, flow modifiers and pigment and incorporates a thermoplastic or thermoset carrier (hereinafter referred to as "electroconductive ceramic thermoplastic paint" and "electroconductive ceramic thermoset paint", respectively). Paints which use a thermoplastic or thermoset carrier are often referred to as hot melt paints. Non-electrically conductive hot melt coatings for use on glass are disclosed in U.S. Pat. No. 5,346,933 to Knell and U.S. Pat. No. 5,411,768 to Knell et al. Non electrically conductive hot melt paints are also used in the can and bottling industry to mark the outer surface of the vessel. Electroconductive ceramic thermoplastic paint has been used to form heating lines on a rear window of a vehicle, as disclosed in Canadian Patent 1,193,150. In the instant invention, an electroconductive ceramic thermoplastic or thermoset paint is applied along surface 24 of ply 16 to form patch 34 using a screen printing process which incorporates a heated metal screen that melts the paint and maintains it in liquid form. When the hot paint contacts the cooler glass surface, the paint sets, i.e. it immediately dries. It should be appreciated that although the paint may be dry, it still must be heated to cure and bond the paint to the glass surface, as with an electroconductive ceramic IR paint. This type of paint provides an advantage over electroconductive ceramic IR paints in that since the thermoplastic/thermoset paints dries immediately, the glass ply may be handled without fear of smudging the pattern formed by the grid lines 36, and additional material may be screen printed directly over the previously screened pattern. As another alternative, the grid pattern may be formed using an opaque electroconductive ceramic paint which includes silver particles, flow modifiers and pigment and incorporates an ultraviolet radiation cured carrier (hereinafter referred to as "electroconductive ceramic UV paint"). The electroconductive ceramic UV paint is dried by exposing the grid pattern to UV light; however, like the other paints discussed above, the electroconductive ceramic UV paint still must be heated to cure and bond the paint to the glass surface.

It should be appreciated that although the patch material discussed above is an electroconductive ceramic paint, other electroconductive materials may be used to form a capacitive connection to the antenna coating with the required visibility coefficient, such as but limited to electrically conductive screens or meshes, wires, inks, plastics, tapes or decals.

The patch pattern includes an opaque area, i.e. an area physically coated with the grid lines, and a non-opaque area, i.e. the uncoated area between the grid lines. In order to measure the degree of visibility through the patch, as used herein, the term "visibility coefficient" means the ratio of the non-opaque area of the patch to the total area of the patch, i.e. the sum of the non-opaque and opaque areas. It is apparent that the higher the visibility coefficient, the more "transparent" the patch. More specifically, a visibility coefficient of 1 would indicate that there are no opaque elements in the connector arrangement while a visibility coefficient of 0 would indicate a completely opaque connector arrangement.

To connect the patch 34 to cable 30, a wire lead 38 is secured to the patch 34. Although not required, in the particular embodiment illustrated in FIGS. 2 and 3, wire 38 is soldered directly to the patch 34. A terminal assembly 40 (shown only in FIG. 3), for example a reinforced spade assembly, a male Jaso pin, or other electrical connection device well known in the art, is connected to end 42 of wire 38 so that the coaxial cable 30 may be secured to feed arrangement 26. To facilitate connection of lead 38 to patch 34 by soldering, a connector pad 44 in the form of a solid coating of the patch material may be provided in the patch 34. As an alternative to soldering a wire lead 38 to patch 34, a metal clip (not shown) of a type well known in the art, may be secured to pad 44 of patch 34, for example by soldering, with a wire or coaxial cable being secured to the metal clip. Furthermore, if desired, coaxial cable 30 may be connected directly to pad 44.

Figure 4:
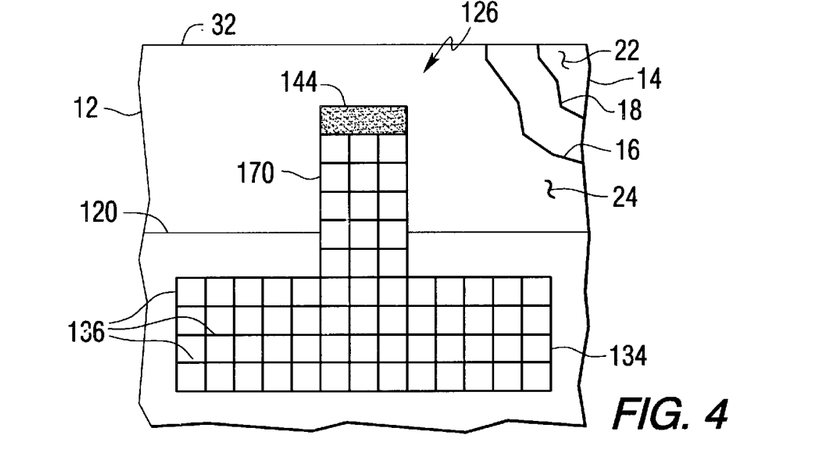
FIGS. 4, 5 and 6 are plan views similar to FIG. 2 illustrating additional embodiments of the invention, with portions removed for clarity.
Figure 5:
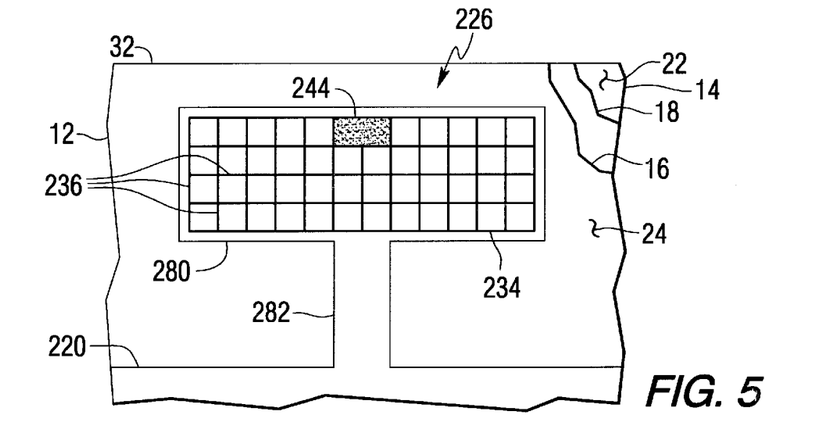

Referring to embodiment of the invention illustrated in FIG. 4, if it is desired to position an antenna feed arrangement 126 near the upper edge 32 of the windshield 12 and the antenna element is configured such that it is spaced from edge 32, a patch 134 having grid lines 136 may be configured to include an extension 170 which extends along surface 24 of inner ply 16 from the portion of the patch 134 overlaying the coating forming antenna element 120, toward upper edge 32. A connector pad 144 is positioned at the end of extension 170 near edge 32. Although not shown in FIG. 4, the coating forming antenna element 120 may also be extended toward edge 32 to provide additional antenna area which may be overlaid by the patch 134 in order to provide the desired capacitance for the antenna feed arrangement 126. FIG. 5 illustrates another embodiment where it is desired to move the entire patch of an antenna feed arrangement 226 close to windshield edge 32 while maintaining the antenna coating spaced from the edge 32. More specifically, a portion of the coating forming antenna element 220, and in particular coated area 280 is positioned on surface 22 of outer ply 14 along edge 32 with connecting area 282 electrically interconnecting area 280 with antenna element 220. Patch 234 with grid lines 236 and connecting pad 244 is positioned on surface 24 of inner ply 16 to overlay at least a portion of the area 280 and provide the desired capacitive characteristics of the connection. Although not required, the coated areas 280 and connecting area 282 may be made of the same material as antenna element 220.

Although not required, it is preferred that the coating forming the antenna elements 20, 120 and 220 and additional coating areas such as area 280 not extend to the edge 32 of the windshield 12, but rather terminate at least 1 mm from edge 32. This will insure that the coating is completely sealed within the windshield 12 and will inhibit coating degradation along edge 32. It is also desired that the patch 34, 134 and 234 be positioned on the windshield 12 such that it does not electrically interact, either by direct electrical contact or capacitive coupling, with other electroconductive elements in the motor vehicle because such interaction may degrade and weaken the strength of the signal generated by the antenna element. More specifically, referring to FIG. 3, a windshield 12 is typically supported in a motor vehicle 46 on a metal ledge 48 and secured to the vehicle by an adhesive 50, which in some instances is electrically conductive. In addition, ornamental strips 52 or other types of moldings which may be formed from electrically conductive materials, may be positioned along selected edges of the windshield 12 to hide the space between the windshield 12 and the mounting frame of the vehicle 46. The patch 34 should be spaced from such vehicle elements a sufficient distance to at least minimize and preferably avoid such adverse electrical interaction.

Figure 6:
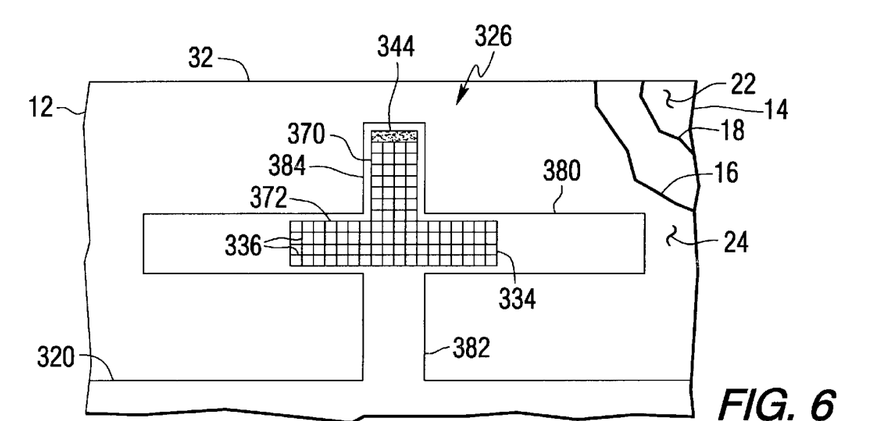

FIG. 6 illustrates another embodiment of the instant invention wherein the antenna element includes various shapes and the patch overlays selected portions of the coating forming the antenna element(s). More specifically, the antenna pattern, which is applied to surface 22 of outer ply 14 and is similar to that disclosed in U.S. Pat. No. 5,528,314, includes a first coating element 320 covering the central portion of the windshield 12, a second coating element 380 positioned between the first coating element 320 and the upper edge 32 of the windshield 12, and a third coating element 382 electrically interconnecting the first and second coating elements. Patch 334 of the antenna connector arrangement 326 includes grid lines 336 and is configured to extend along surface 24 of inner ply 16 from the upper edge 32 of the windshield 12 and overlay a selected portion of the second coating element 380. More specifically, patch 334 includes a section 372 which overlays a portion of coating element 380 and a section 370 which extends from section 372 toward edge 32. A connection pad 344 is positioned near windshield edge 32 for connection of the patch 334 to a lead to the radio. Although not required, the coating pattern may include a fourth coating element 384 extending from the second coating element 382 toward the windshield edge 32. As discussed earlier, this additional element provides additional coating area that may be overlaid by the patch 334 for additional capacitive coupling. However, it should be appreciated that the antenna pattern may eliminate the third and fourth antenna elements, as disclosed in U.S. Pat. No. 5,670,966.

An embodiment of the invention that provides an acceptable signal for an antenna 20 to a receiving device 28, includes an antenna coating configured as in FIG. 6, with the coating having a resistivity of approximately 3 ohms per square. Patch 334 is "T" shaped as discussed above and overlays selected portions of the antenna coating element. More specifically, in this particular embodiment, section 372 of patch 334 is about 45 mm by 130 mm and overlays a portion of second coating 380, and section 370 of patch 334 is about 22 mm by 45 mm and overlays a portion of the fourth coating element 384. Grid lines 336 are 0.4 mm wide and spaced both horizontally and vertically at intervals ranging from about 4.5 to 20 mm, depending on the particular location of the grid line within the overall pattern. An area of section 370 about 22 mm by 13 mm is covered with a solid coating of electroconductive ceramic paint, i.e. without the grid pattern, to form connection pad 344 for a connecting wire or coaxial cable. The grid lines 336 and connector pad 344 are formed by an opaque electroconductive thermoplastic paint produced by Cerdec Corporation, Washington, Pa., which includes about 76% silver powder, 2% lead borosilicate glass frit, and the remainder pigment, acrylic resin (flow modifier) and 1-octadecanol (thermoplastic carrier). The thermoplastic paint has a resistivity of about 0.035 ohms per square and overlays approximately 1008 $mm^2$ (excluding connection pad 344) of the antenna coating, while extending over a total area of approximately 6554 $mm^2$ (excluding connection pad 344). This pattern results in a visibility coefficient of about 0.85. Increasing the grid line width from 0.4 mm to 0.8 mm would reduce the visibility coefficient to about 0.69, while reducing the line width to 0.2 mm would increase the visibility coefficient to about 0.92.

It should be appreciated that the opaque area required to overlay a corresponding portion of the antenna element, i.e. the actual area covered by grid lines that overlays a corresponding area of the antenna element coating, will depend on the performance requirements of the antenna and the materials forming the windshield, antenna and connection. It should be further appreciated that the patch may extend beyond the antenna element such that the entire opaque area does not overlay and capacitively couple to a corresponding portion of the antenna element.

Although FIGS. 2–6 illustrate rectangular grid patterns for patches 34, 134, 234 and 334, respectively, other patterns, such as but not limited to interconnected circles or other curvilinear shapes and patterns, may be used to provide the necessary capacitive connection to the antenna 20 while allowing the occupant of the vehicle to "see through" the patch. Based on the design requirements, it is expected that a pattern with the visibility coefficient approaching 1 may be formed from opaque lines and still provide acceptable capacitive coupling performance.

Figure 7:
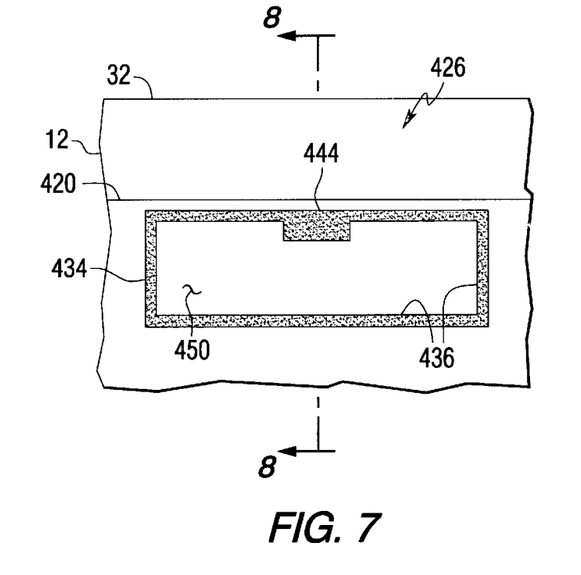
FIG. 7 is a plan view similar to FIG. 2 illustrating an alternate embodiment of the invention, with portions removed for clarity.
Figure 8:
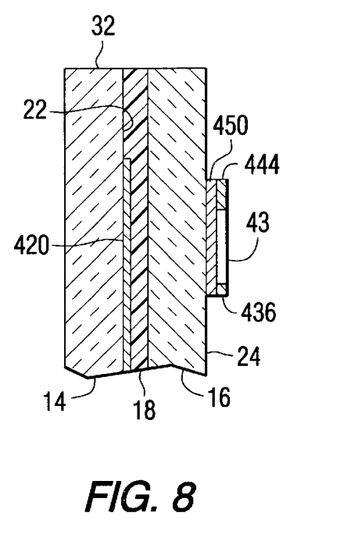
FIG. 8 is a sectional view taken along line 8—8 in FIG. 7.

As an alternative to using only a single type of material for the patch, it should be appreciated that the patch may be constructed from a combination of materials of the type discussed earlier, such as but not limited to electroconductive paints and metal tape. Referring to FIGS. 7 and 8, it is also contemplated that an antenna connector arrangement 426 may include a patch 434 formed from a transparent electroconductive coating 450 used in combination with opaque electroconductive members 436 to capacitively couple with antenna element 420. The coating 450 for patch 434 is applied to surface 22 of outer ply 14 and may be similar to the transparent coating forming the antenna element 420. Members 436 are applied to surface 24 of inner ply 16 and may be opaque electroconductive materials as discussed earlier. Member 436 may have any configuration required to provide the desired performance. If required, the arrangement 426 may include an electroconductive connector pad 444, similar to pad 44 discussed earlier, to facilitate connection of a connecting wire and/or coaxial cable to the patch. It should be appreciated that if the arrangement 426 does not include the opaque members 436, the visibility coefficient of the arrangement (excluding pad 444) would be 1.

Figure 9:
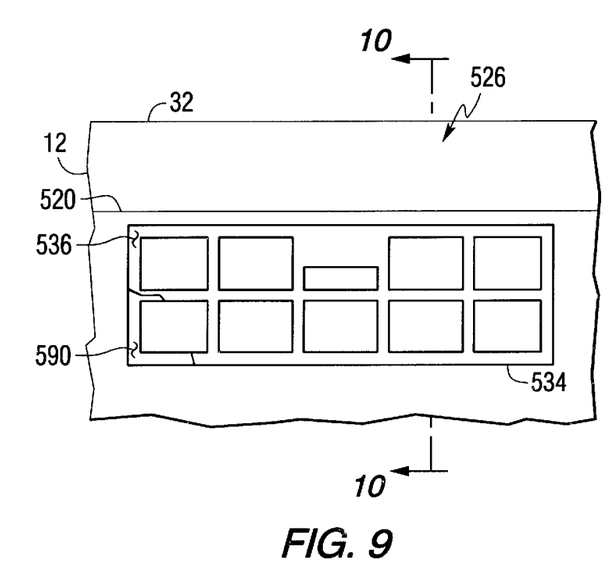
FIG. 9 is a plan view similar to FIG. 2 illustrating an alternate embodiment of the invention, with portions removed for clarity.
Figure 10:
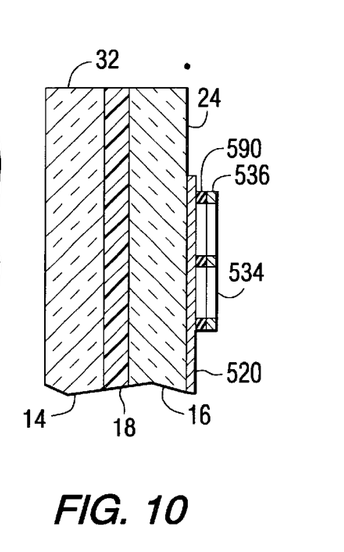
FIG. 10 is a sectional view taken along line 10—10 in FIG. 9.

In the embodiments of the invention discussed above, at least one glass ply serves to separate the antenna element from the antenna connection. However it should be appreciated that the antenna coating and the connector may both be applied to the same surface of the substrate. More specifically, referring to FIGS. 9 and 10, the coating forming antenna element 520 is applied to major surface 24 of inner ply 16. Connector arrangement 526 includes a patch 534 having a non-electroconductive material 590 applied in a predetermined pattern over a portion of antenna element 520, and an electroconductive material 536 applied over the pattern of material 590. Material 590 will electrically insulate material 536 from antenna element 520 such that material 536 is capacitively coupled to the antenna coating. If required, the pattern formed by material 590 may be slightly larger than the overlaying pattern of material 536 to ensure that material 536 does not make direct electrical contact with antenna element 520. Although it is anticipated that both materials 590 and 536 would be opaque, if material 590 is opaque, e.g. a conventional ceramic paint typically used in the automotive glass industry for decorative borders, material 536 may be transparent. Conversely, if material 536 is opaque, e.g. an opaque electroconductive paint of the type discussed earlier, material 590 may be transparent. In addition, although FIGS. 9 and 10 shown the antenna element on the exposed surface of a laminate, it should be appreciated that an antenna element positioned on a single transparent ply may use the same connector arrangement as discussed above.

Figure 11:
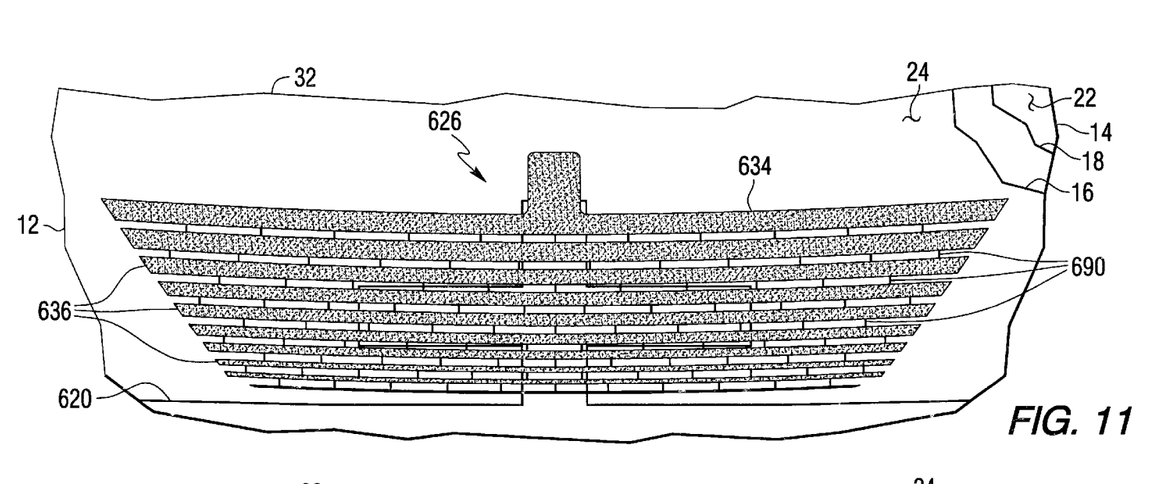
FIGS. 11 and 12 are plan views similar to FIG. 2 wherein the antenna connection arrangement is designed to provide limited visibility through the patch connector, with portions removed for clarity.
Figure 12:
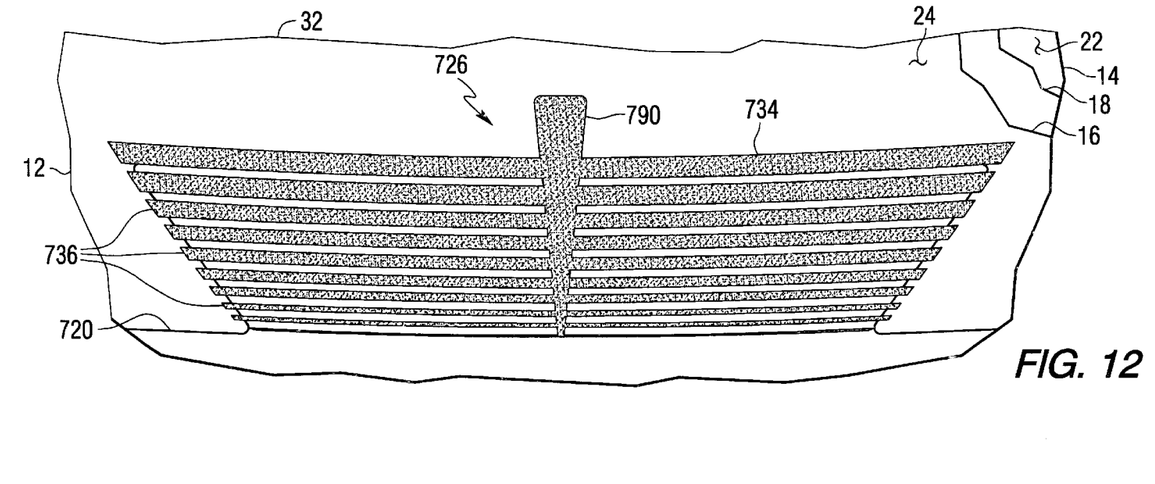

It is also contemplated that the pattern used for the capacitive patch may be enlarged to provide partial shading for occupants of the vehicle. More specifically, sun visors are typically positioned at the upper left and right portions of the windshield of a motor vehicle to provide shading from sunlight for the driver and the front seat passenger, respectively. Referring to FIGS. 11 and 12, it is contemplated that a patch 634 may be positioned at the center of a windshield 12 and configured as a "third visor" to provide both shade to the inner vehicle compartment and, if desired, limited amount of visibility through the patch covered portion of the windshield, while still functioning as part of an antenna feed 626 for the antenna system. In the particular embodiment of the invention illustrated in FIG. 11, the patch 634 configuration includes a plurality of horizontally oriented lines 636 formed from electroconductive ceramic paints of the type discussed earlier. Lines 636 are all electrically interconnected by a plurality of vertical lines 690 spaced along the length of the lines 636. This particular patch pattern includes ten lines each spaced 3 mm apart. The line width progressively changes from a 10 mm width at the top (i.e. near windshield edge 32) to a 1 mm width at the bottom of the pattern. In positioning the pattern on the inner major surface of the windshield 12, the uppermost line may be positioned either above or below the opaque decorative border (not shown) that may extend around the periphery of the windshield. In addition, if desired, at least a portion of the pattern may be aligned behind a shadeband (not shown) which is typically incorporated into the interlayer 18. The entire pattern serves to block a desired amount of sunlight from entering the vehicle while still providing a limited amount of visibility through the patch. The horizontal line configuration in FIG. 12 is similar to FIG. 11 except that a single vertical line 790 is used to electrically interconnect all the horizontal lines 736. The portion of the patches in FIGS. 11 and 12 which overlays a portion of the coating forming antenna elements 620 and 720, respectively, forms a capacitive couple to the antenna as discussed earlier. These particular configurations provide a visibility coefficient of approximately 0.33. It should be noted that in the particular embodiment of the invention illustrated in FIG. 11, the coating forming antenna element 620 is similar to that coating pattern in FIG. 6 and the pattern of patch 634 overlays a portion of antenna coating but does not directly correspond to the shape of coating, while in the embodiment of the invention illustrated in FIG. 12, that coating forming antenna element 720 is configured such that most, if not all of the patch 734 overlays a corresponding portion of the antenna coating.

The incorporation of the capacitive connector into a third visor enables very large patches, which in turn improve signal coupling for low frequency signal antenna, without aesthetic impairment of the windshield.

In designing the capacitive patch as a third visor, since the line elements are electroconductive, care should be taken to configure the line elements so that the patch does not act as an antenna that interferes with antenna element 620.

The present invention provides an antenna connection arrangement having a predetermined amount of visibility through the connector while capacitively coupling to the antenna coating. More specifically, the patch area has a visibility coefficient between 0 and 1, i.e. greater than 0 but less than 1, and preferably 0.1 to 0.95. In embodiments of the invention where the connector arrangement is also used to provide additional shading to the interior of the vehicle, it is preferred that the patch have a visibility coefficient of up to about 0.5, and preferably, about 0.1 to 0.4. For other connector arrangements, it is preferred that the patch have a visibility coefficient of about 0.5 to 0.95, preferably about 0.6 to 0.9.

Although the embodiments of the invention discussed above show the patch being applied directly to a major surface of the transparent substrate, it should be appreciated that the patch may be applied to a separate element, e.g. a polyester film, which in turn is secured to the substrate in a manner that allows the patch to overlay and capacitively couple to the antenna element.

The antenna feed arrangement as discussed above and shown in FIGS. 1–12 is a capacitive connection. More specifically, the electroconductive patch overlays and is spaced from the coating forming the antenna element(s) by a dielectric. However, it should be appreciated that a "see through" connector of the type disclosed herein may also be configured to make direct electrical connection to the antenna element. More specifically, for example, referring to FIGS. 9 and 10, material 590 may be eliminated so that electroconductive patch material 536 is in direct electrical contact with antenna element 520. The patch material making the direct electrical connection is preferably an electroconductive ceramic paint of the type discussed earlier and would be configured to provide a visibility coefficient between 0 and 1. It is noted that for a direct electrical connection, it is not necessary for the patch to overlay a portion of the antenna element but merely be in direct electrical contact with the antenna element. It should also be appreciated that outer ply 14 and interlayer 18 may be eliminated so that the transparent antenna would include only a single glass ply. In addition, another ply may be secured to the single glass ply such that the antenna element and direct connection are laminated between the plies.

The invention described and illustrated herein represents a description of illustrative preferred embodiments thereof. It is understood that various changes may be made without departing from the gist of the invention defined in the following claims.

We claim:

1. A transparent antenna comprising:

a transparent dielectric substrate;

an electroconductive antenna element positioned along a major surface of said substrate;

an electroconductive patch having selected portion overlaying selected portion of the electroconductive antenna element, the electroconductive patch defined by an opaque outline and having a non-opaque portion within the outline, the electroconductive patch electrically connected to said antenna element, wherein said patch has a visibility coefficient within the range of greater than 0 and less than 1.

2. The antenna as in claim 1 wherein said opaque outline of said patch is formed from material selected from the group consisting of electroconductive ceramic IR paints, electroconductive ceramic thermoplastic paints, electroconductive ceramic thermoset paints, and electroconductive ceramic UV paints.

3. The antenna as in claim 1 wherein said transparent substrate is a glass ply, said antenna element is a transparent electroconductive coating applied to said major surface of said glass ply, and the opaque outline of said patch is formed from an opaque electroconductive paint applied along an opposing major surface of said glass ply such that said electroconductive paint overlays at least a portion of said electroconductive coating and is capacitively coupled to said electroconductive coating.

4. The antenna as in claim 1 wherein said patch has a visibility coefficient of 0.1 to 0.95.

5. The antenna as in claim 7 wherein the patch further includes opaque elements within the outline to define spaced areas and the opaque elements of the electroconductive patch are a plurality of spaced opaque elements extending in a first direction defined as first spaced member and a plurality of spaced opaque elements extending in a second direction different than the first direction defined as second spaced elements, the second spaced elements between and intersecting the first spaced elements to define the opaque area and the non-opaque portion.

6. The antenna as in claim 5 wherein said transparent substrate is a glass ply, said antenna element is a transparent electroconductive coating applied to said major surface of said glass ply, further including a nonelectroconductive material applied in a predetermined pattern over the portion of said electroconductive coating and said patch is formed from an opaque electroconductive paint applied over selected portions of said nonelectroconductive material such that said electroconductive paint is spaced from and capacitively coupled to said electroconductive coating.

7. The antenna as in claim 1 wherein the patch further includes at least one opaque area within the outline.

8. The antenna as in claim 7 wherein said transparent substrate is a glass ply, said antenna element is a transparent electroconductive coating applied to said major surface of said glass ply, and said patch is formed from an opaque electroconductive paint in direct electrical contact with selected portions of said electroconductive coating.

9. The antenna as in claim 7 further including a connector secured to said patch to permit transfer of signals generated by said antenna element to an electromagnetic energy transmitting and/or receiving device.

10. A transparent antenna for a motor vehicle, comprising:
    a first glass ply;
    a second glass ply secured in overlaying relation to said first glass ply to form a windshield having at least one exposed major surface;
    a transparent electroconductive antenna element positioned along a major surface of one of said first and second glass plies; and
    an electroconductive patch positioned at least in close proximity to the at least one exposed major surface of said second ply spaced from the antenna, wherein said patch is defined by an outline and having opaque elements within the outline to define discrete spaced areas wherein at least one of the areas is an opaque area and at least one of the areas is a non-opaque area wherein the patch overlays at least a portion of said antenna element to capacitively couple with said antenna element, and has a visibility coefficient within the range of greater than 0 and less than 1.

11. The transparent antenna as in claim 10 wherein said transparent electroconductive antenna element is positioned between said first and second glass plies.

12. The antenna as in claim 11 wherein the opaque elements of the electroconductive patch are a plurality of spaced opaque elements extending in a first direction defined as first spaced elements and a plurality of spaced opaque elements extending in a second direction different than the first direction defined as second spaced elements, the second spaced elements between and connected to the first spaced elements to define the discrete spaced areas.

13. The antenna as in claim 12 wherein the first and second spaced elements of said opaque area of said patch is formed from material selected from the group consisting of electroconductive ceramic IR paints, electroconductive ceramic thermoplastic paints, electroconductive ceramic thermoset paints, and electroconductive ceramic UV paints.

14. The antenna as in claim 12 wherein a connector is to be secured to the opaque are of said patch.

15. The antenna as in claim 14 wherein said patch includes a first section spaced from an edge of said second ply and a second section extending from said first section toward said edge of said second ply, wherein said opaque area is positioned within said second portion of said patch.

16. The antenna as in claim 11 wherein said antenna element is a transparent electroconductive coating applied to a major surface of said first ply and said patch is applied to said at least one exposed major surface of said second ply and further including a connector secured to said opaque area of said patch to permit transfer of signals generated by said antenna element to an electromagnetic energy transmitting and/or receiving device.

17. The antenna as in claim 16 wherein said patch applied to said at least one exposed major surface is spaced a sufficient distance from peripheral edges of the windshield to prevent degradation of said signal when the windshield is mounted in the motor vehicle due to electrical interaction between said patch and electroconductive elements of the motor vehicle.

18. The antenna as in claim 16 wherein said patch has a visibility coefficient of 0.1 to 0.95.

19. The antenna as in claim 18 wherein said antenna element is a first antenna element positioned at least on a central portion of said major surface of said first ply of said windshield and spaced from and extending along peripheral edges of said first ply, and at least one additional antenna element positioned on said major surface of said first ply between said first antenna element and a selected peripheral edge of said first ply, wherein said patch overlays at least a portion of said additional antenna element.

20. The antenna as in claim 18 wherein said patch is applied to said at least one exposed major surface of said second ply spaced a sufficient distance from peripheral edges of the windshield to prevent degradation of said signal when the windshield is mounted in the motor vehicle due to electrical interaction between said patch and electroconductive elements of the motor vehicle.

21. The antenna as in claim 18 wherein said patch has a visibility coefficient of 0.1 to 0.5.

22. The antenna as in claim 18 wherein said patch has a visibility coefficient of 0.5 to 0.95.

23. The antenna as in claim 18 wherein said non opaque areas of said patch include a transparent electroconductive coating.

24. The transparent antenna as in claim 10 wherein said patch is spaced from the antenna by a non-electroconductive material between the antenna and the patch.

25. A method of making a transparent antenna comprising the steps of:
    positioning an electroconductive antenna element at least in close proximity to a major surface of a rigid transparent dielectric ply,
    applying an electroconductive patch having an outline and opaque elements within the outline to define spaced discrete areas wherein at least one of the areas is an opaque area and at least two of the areas are non-opaque areas, the patch having a visibility coefficient within the range of greater than 0 and less than 1; and
    positioning said patch over the electroconductive element such that said patch is electrically connected to said antenna element.

26. The method as in claim 25 wherein said applying step is a first applying step, said ply is a glass ply and said positioning step includes the step of applying a transparent electroconductive coating to said major surface of said ply defined as a second applying step, and said first applying step includes the step of positioning said patch on said major surface such that said patch is in direct electrical contact with said coating and further including the step of securing a lead to said patch to permit transfer of signals generated by said antenna element to an electromagnetic energy transmitting and/or receiving device.

27. The method as in claim 25 wherein said applying step is a first applying step, said ply is a glass ply and said positioning step includes the step of applying a transparent electroconductive coating to said major surface of said glass ply defined as a second applying step, and said first applying step includes the step of positioning said patch in spaced apart relation from said coating such that said patch overlays at least a portion of said antenna element and is capacitively coupled to said antenna element and further including the step of securing a lead to said patch to permit transfer of signals generated by said antenna element to an electromagnetic energy transmitting and/or receiving device.

28. The method as in claim 27 further including the step of securing a second glass ply to said first glass ply to form a laminate, such that said antenna element is between said first and second plies, and wherein said second applying step includes the step of applying said electroconductive patch to an exposed major surface of said laminate.

29. The method as in claim 25 wherein said applying step is defined as a first applying step, said ply is a glass ply and said positioning step includes the step of applying a transparent electroconductive coating to said major surface of said glass ply defined as a second applying step, and said second applying step includes the step of positioning said patch on an opposing major surface of said glass ply such that said patch overlays at least a portion of said antenna element and is capacitively coupled to said antenna element.

30. The method as in claim 25 wherein the applying step forms a pattern defined by the opaque elements crossing one another.

31. An electrical connector for a transparent antenna element comprising:

a plurality of spaced discrete electroconductive members with selected portions and/or members overlaying selected portions of the antenna element, and a conductor electrically connecting selected ones of said members.

32. The connector as in claim 31 wherein each of the members is an elongated member, are spaced from one another in a vertical portion and have their longitudinal axis aligned with one another.

33. The connector as in claim 32 wherein the conductor is an elongated conductor having a longitudinal axis transverse to the axis of the members and electively interconnecting each of the spaced discrete members.

34. The connector as in claim 33 wherein an imaginary boundary encompassing said electroconductive member has a visibility coefficient of 0.1 to 0.95.

35. The connector as in claim 34 wherein said electroconductive member and the elongated member are an opaque electroconductive coating.

36. The connector as in claim 31 further including a transparent electroconductive coating.

37. The connector as in claim 32 wherein an imaginary boundary encompassing said electroconductive members has a visibility coefficient of 0.1 to 0.95.

38. The connector as in claim 37 wherein said electroconductive members are an opaque electroconductive ceramic paint.

* * * * *